United States Patent [19]
Hajjar et al.

[11] Patent Number: 5,726,965
[45] Date of Patent: Mar. 10, 1998

[54] INTERSYMBOL INTERFERENCE DETECTION IN AN OPTICAL RECORDING SYSTEM USING A REFLECTED WRITE SIGNAL

[75] Inventors: Roger A. Hajjar, Fairport; Jeffrey Thomas Klaus; Clarke K. Eastman, both of Rochester, all of N.Y.

[73] Assignee: Eastman Kodak Company, Rochester, N.Y.

[21] Appl. No.: 608,802

[22] Filed: Feb. 29, 1996

[51] Int. Cl.$^6$ .................... G11B 7/00; G11B 3/90
[52] U.S. Cl. .................... 369/124; 369/54
[58] Field of Search .................... 369/116, 124, 369/59, 53, 54, 58, 44.32, 100

[56] References Cited

U.S. PATENT DOCUMENTS

| | | |
|---|---|---|
| 4,308,612 | 12/1981 | Miyauchi et al. . |
| 4,680,594 | 7/1987 | Bracht . |
| 4,719,612 | 1/1988 | Kenjyo . |
| 4,727,531 | 2/1988 | Ito et al. . |
| 4,789,974 | 12/1988 | Satoh et al. . |
| 4,800,548 | 1/1989 | Koishi et al. . |
| 4,866,692 | 9/1989 | Saito et al. . |
| 5,126,994 | 6/1992 | Ogawa et al. . |
| 5,165,089 | 11/1992 | Jaquette et al. .................... 369/59 |
| 5,206,853 | 4/1993 | Tanaka .................... 369/54 |
| 5,216,660 | 6/1993 | Iimura . |
| 5,309,424 | 5/1994 | Ogawa . |
| 5,436,880 | 7/1995 | Eastman et al. . |
| 5,440,534 | 8/1995 | Eastman et al. . |
| 5,446,716 | 8/1995 | Eastman et al. . |
| 5,557,592 | 9/1996 | Kobayashi et al. .................... 369/59 X |
| 5,586,100 | 12/1996 | Lee et al. .................... 369/124 |

OTHER PUBLICATIONS

Philips CDD521 Service Manual, Professional Compact Disc Recorder, published by Serice & Support Interactive Media Systems, The Netherlands.

*Primary Examiner*—Paul W. Huber
*Attorney, Agent, or Firm*—Raymond L. Owens

[57] ABSTRACT

An apparatus and method for use in an optical recording system in which an incident beam records data on an optical recording medium as marks and in which a return beam reflected from the medium is detected in an optical detector to provide a reflected write signal. A number of reflected write pulses of the reflected write signal are monitored in an interference detector. The peak voltage or other suitable characteristic of a reflected pulse corresponding to a mark following a relatively short land is compared to the same characteristic of another reflected pulse corresponding to a mark following a longer land. An error signal is generated based on the comparison and provides an indication of the amount of intersymbol interference (ISI) present during recording of the marks corresponding to the first and second reflected pulses.

16 Claims, 7 Drawing Sheets

INTERSYMBOL INTERFERENCE DETECTION IN AN OPTICAL RECORDING SYSTEM USING A REFLECTED WRITE SIGNAL

FIELD OF THE INVENTION

The present invention relates to optical data recording systems and, more particularly, to the detection of intersymbol interference (ISI) in an optical recording system by sensing mark formation using a reflected write signal.

BACKGROUND OF THE INVENTION

Data is generally recorded on an optical medium, such as a recordable compact disk (CD-R), in the form of marks. A mark has a different reflectivity than the unmarked portions of the medium, or lands, and is formed using an incident write signal power level sufficient to alter the reflectivity of the medium. The marks and lands represent different binary logic levels within the recording data. Direct-read-during-write (DRDW) systems typically monitor a reflected write signal, also referred to as a DRDW signal, while a mark is being written on the medium. The reflected write signal can be processed to determine whether or not the mark has been properly formed, or, in other words, whether the data has been properly recorded on the medium.

A CD-R medium often includes data recorded using an encoding technique such as eight-to-fourteen bit modulation (EFM). Proper recording of EFM-encoded data may require that a mark-to-land or land-to-mark data transition not deviate by more than about ±0.5 of a clock pulse length from its optimal position. The position tolerance $\Delta\epsilon$ in a direction tangential to a given data track is therefore given by:

$$\Delta\epsilon = \pm 0.5 vT$$

in which v is the beam scanning velocity and T is the data clock period. For a system with a scanning velocity of 1.25 m/sec and a data rate of 4.32 Mbits/sec, the position tolerance $\Delta\epsilon$ is about $\pm 0.5 \times (1.25 \text{ m/sec})/(4.32 \text{ MHz})$ or $\pm 0.14$ µm. A transition that is shifted outside of its proper clock window will generally introduce an error upon subsequent reading of the recorded data.

Intersymbol interference (ISI) in the recording context refers generally to variation in the positions of recorded data transitions depending upon the data that precede and/or follow the transitions during recording. ISI may be produced by thermal cross-talk in which, for example, pre-heating of a portion of the medium by the recording beam lengthens a mark written too close to a neighboring mark. Thermal cross-talk may result from undue increases in write or bias power levels, as well as from aberrations in the beam spot. Thermal cross-talk is also dependent upon the recording strategy, that is, the length and/or shape of the incident write pulse used to form a given mark. Exemplary write strategies include NT strategies in which the write pulse length is the same as the desired mark length, and (N−1)T strategies in which the write pulse length is one clock period less than the desired mark length. A P2(N−1)T write strategy is an (N−1)T strategy in which the write power level is increased by 20% during the first 1.5T of each write pulse.

Exemplary DRDW techniques are disclosed in U.S. Pat. Nos. 5,126,994 and 5,216,660, both assigned to Sony Corporation. The Sony DRDW techniques generally involve sampling a reflected write pulse at two points in time, once during a period of maxima reflected signal power before a mark begins to form, and then after the mark formation process has reached a steady state. A laser power control servo loop adjusts the incident beam power such that a ratio of the two sample values is held constant in an attempt to provide proper mark formation. Although the Sony DRDW techniques may provide a suitable indication of proper mark formation in certain applications, the techniques generally do not adequately address the above-noted effects of ISI arising during data recording.

As is apparent from the above, a need exists for an improved optical recording system in which ISI can be detected accurately and efficiently by monitoring a reflected write signal during data recording.

SUMMARY OF THE INVENTION

The present invention provides an apparatus and method for detecting one or more sources of intersymbol interference (ISI) in an optical recording system during data recording. The invention utilizes a reflected write signal, also referred to as a direct-read-during-write (DRDW) signal, which is generated by detecting an optical return beam reflected from a disk or other medium during recording. A number of reflected write pulses of the reflected write signal are monitored in an ISI detector. The peak voltage or other suitable characteristic of a reflected pulse corresponding to a mark following a relatively short land is detected and compared to the same characteristic of one or more other reflected pulses corresponding to marks following longer lands. An error signal is generated based on the comparison and provides an indication of the amount of ISI present during recording of the corresponding marks. The detected characteristic may also be in a portion of a reflected write signal preceding the pulse used to record a mark. The term "reflected write pulse" as used herein should therefore be understood to include such preceding portions.

In accordance with one embodiment of the invention, an ISI detector is provided which includes a resettable integrator. An integrating capacitor charges during each reflected write pulse and the resulting integrator output voltage is sampled for a first pulse following a land of length 3T and a second reflected pulse following a land of length greater than or equal to 5T. The samples are supplied to a differential amplifier to generate an error signal indicative of ISI arising during recording of neighboring marks. The error signal may be normalized by dividing it by the sampled integrator output corresponding to the second reflected pulse.

In accordance with another embodiment of the invention, an ISI detector is provided which includes an integrator with partial feedback of the integrator output voltage for each input reflected write pulse. An integrating capacitor integrates the positive current generated by each input reflected pulse. A predetermined portion of the voltage across the capacitor is removed by connecting the feedback path for the duration of a reference pulse generated during each reflected write pulse. The integrator output voltage settles to a steady-state value after a predetermined number of pulses having consistent amplitude characteristics. Deviations of a particular pulse or pulses from the steady-state value will then produce variations in the integrator output. The relatively high frequency variations are detected by applying a filtered integrator output to positive and negative envelope follower circuits, and applying the envelope follower outputs to inputs of a differential amplifier which generates an error signal. The error signal is normalized by dividing it by an average value of the integrator output which may be obtained by low pass filtering.

The present invention provides ISI error signals which may be used in numerous recording system applications. For example, an ISI error signal could be monitored during a series of trial recordings on a designated section of a CD-R medium to determine optimum write strategies and/or power levels. In addition, the ISI error signal can be used to predict the quality of a given write strategy as a function of power level during recording, or to detect unnecessary increases in write or bias power levels given a particular recording strategy. The ISI error signal could also be used to detect optical spot aberrations which are known to produce thermal cross-talk.

DETAILED DESCRIPTION OF THE PREFERRED EMBODIMENTS

Figure 1:
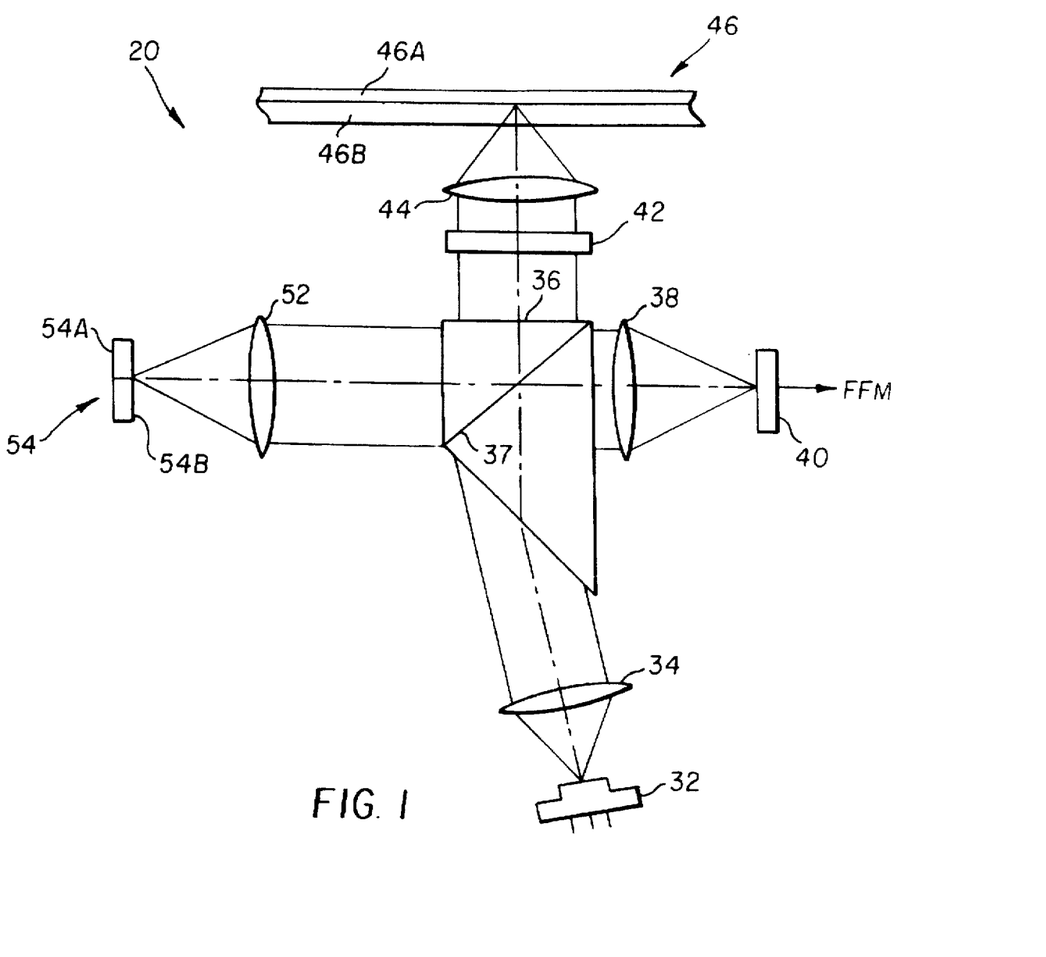
FIG. 1 is a block diagram of an exemplary optical recording system in which intersymbol interference (ISI) detection in accordance with the present invention may be implemented.

FIG. 1 shows an exemplary optical system 20 in which the intersymbol interference (ISI) detection of the present invention may be utilized. It should be emphasized that the ISI detection of the present invention could also be utilized in a wide variety of alternative optical systems, including any system in which at least a portion of a reflected write signal can be monitored during a recording operation. The term "ISI" as used herein is intended to include not only mark length variations but also other mark quality variations which result from thermal cross-talk between neighboring marks or other changes experienced by an optical medium during a recording operation. The invention generally involves detecting differences between characteristics of two or more reflected write pulses of a return beam reflected from an optical recording medium. In one embodiment, peak amplitude differences between the pulses are detected and processed to provide an ISI error signal. Although the peak detection embodiment has the advantage of simplicity, other pulse-to-pulse variations indicative of ISI could also be monitored. For example, the area under the reflected pulse waveform may be integrated, as will be described below in conjunction with FIGS. 4 and 5, or a peak-to-peak envelope may be detected, as will be described below in conjunction with FIGS. 7 and 8. Also, the detected characteristic may be in a portion of a reflected write signal preceding the pulse used to record a mark. The term "reflected write pulse" as used herein should therefore be understood to include such preceding portions.

A laser diode optical source 32 generates an incident radiation beam in system 20 at a wavelength of about 785 nm±5 nm and in a linear polarization state that is primarily p-polarized. The incident beam is collimated by a collimating lens 34 which has a numerical aperture (NA) on the order of 0.4 and is then transmitted through a polarization beam expander/splitter 36 which spatially circularizes the incident beam. The beam expander/splitter 36 may have an s-polarization reflectivity of about 100% and a p-polarization reflectivity of about 20%, indicating that 100% and 20% of the intensity of the s-polarized and p-polarized beam components, respectively, are reflected by an internal surface 37 of the beam splitter/expander 36, and any remaining portions are transmitted through the beam splitter/expander 36.

A portion of the incident radiation beam is reflected by surface 37 toward a detector focusing lens 38 and thereby focused onto a front facet detector 40. The reflected portion of the primarily p-polarized incident beam is detected in detector 40 to provide an indication of the intensity level of the incident radiation beam. The front facet detector 40 is also referred to as a front facet monitor (FFM) or, more generally, an optical source monitor. An FFM signal from detector 40 may be used, for example, to normalize a tracking or data signal, or in a source power servo loop (not shown) to maintain the output power level of source 32 at a desired value. The FFM signal could also be used in a front facet subtraction operation to reduce source noise in a write-once (WO) RF data signal, as described in U.S. Pat. No. 5,363,363 entitled "Apparatus and Method for Laser Noise Cancellation in an Optical Storage System Using a Front Facet Monitor Signal," which is assigned to the assignee of the present invention and incorporated by reference herein.

The p-polarized portion of the incident radiation beam which is not reflected by surface 37 to front facet detector 40 passes through beam expander/splitter 36 and is incident on a quarter wave plate 42. The quarter wave plate 42 converts the p-polarized incident beam to a circularly polarized beam. The circularly polarized incident beam is incident on an objective lens 44 which has a NA of about 0.5 and serves to focus the incident beam onto the surface of an optical storage medium 46.

The storage medium 46 is typically an optical disk which includes data tracks arranged in a spiral or in concentric circles on a data storage surface 46A. The storage medium 46 may be an absorptive dye write-once (WO) medium such as a recordable compact disk (CD-R), an ablative or phase-change medium or any other medium on which optically-detectable marks may be formed. The storage medium 46 may include a transparent polycarbonate substrate 46B which serves as a protective layer over the data storage surface 46A. The exemplary medium 46 in this embodiment also includes a preformed spiral groove or other optically-detectable structure suitable for generating a tracking signal using known techniques.

A return beam reflected from medium 46 is collimated by objective lens 44, and converted to a primarily s-polarized beam by the quarter wave plate 42. The s-polarized return beam is thus substantially reflected by surface 37 and is incident on a detector focusing lens 52. The lens 52 focuses the transmitted portion of the beam onto a multi-element detector 54 which includes first and second detector elements 54A and 54B. The detector elements 54A, 54B generate first and second detected signals from the return beam. In this embodiment, the detector elements are arranged such that each element receives a first order diffraction component in a half-aperture of the return beam. The diffraction components result from interaction of the incident beam with the spiral groove on medium 46. A push-pull tracking error signal is generated by tatting the difference between the detected signals from elements 54A and 54B. To read back previously-recorded data, the optical source 32 generates the incident beam at a substantially constant read power level which is below a recording threshold power level required to form a mark. An RF data signal corresponding to the previously-recorded data is generated by summing the detected signals from detector elements 54A and 54B.

Figure 2:
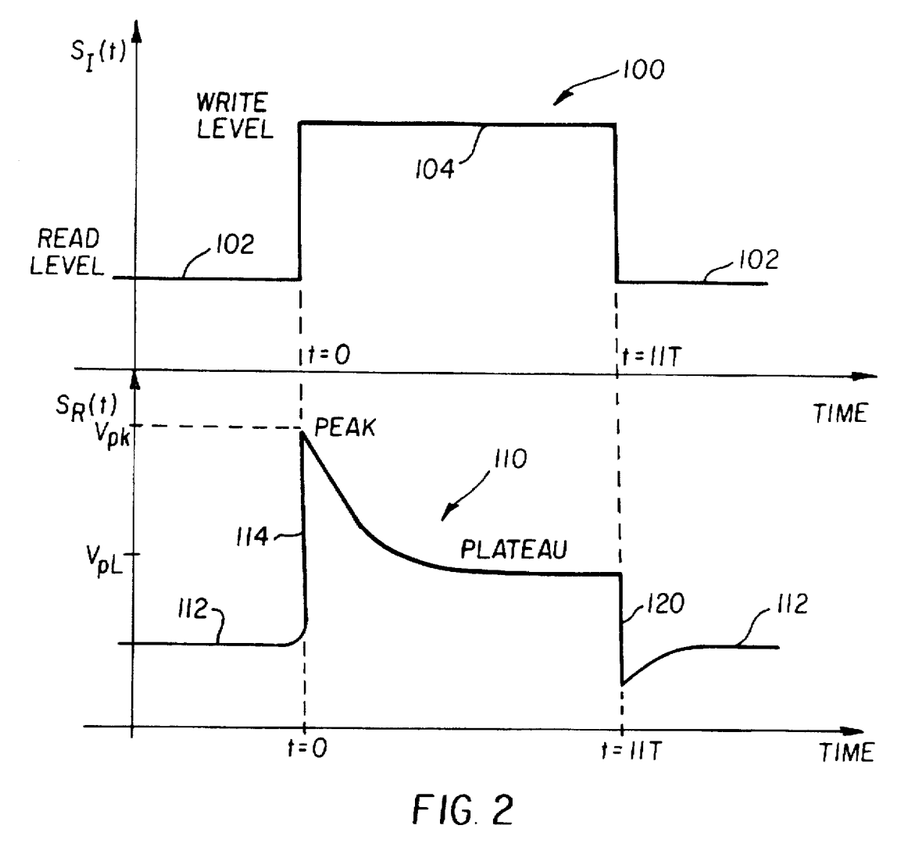
FIG. 2 shows exemplary incident and reflected write signals in the system of FIG. 1.

FIG. 2 shows exemplary incident and reflected write signals used in system 20. An incident write signal $S_I(t)$ includes a write pulse 100 which has a length of 11T. On a CD-R disk using the above-noted EFM encoding, marks and lands can take on discrete lengths of 3T through 11T, in which T corresponds to the data clock period. The amplitude of $S_I(t)$ is at a read power level 102 between pulses and at a write power level 104 for the duration of write pulse 100. The read power level 102 is also referred to as a bias power level. During a recording operation, a stream of recording data is applied to the optical source 32, and the power level of the incident beam is modulated in accordance with the recording data to produce the incident write signal $S_I(t)$. The modulation envelope of $S_I(t)$ shown in FIG. 2 corresponds to the recording data stream applied to the source 32. Marks are formed on medium 46 when $S_I(t)$ is at the write level 104. The write pulse 100 is used to form a mark of length NT, and the length of the pulse 100 will vary depending on the write strategy. For example, in an NT write strategy the pulse 100 will be of length NT, while in an (N−1)T write strategy the pulse 100 will be of length (N−1)T. Other write strategies, such as the above-noted P2(N−1)T strategy, could also be used.

Detector elements 54A, 54B of FIG. 1 detect the return beam during recording and the outputs thereof are summed to provide a reflected write signal $S_R(t)$. The signal $S_R(t)$ is also referred to as a direct-read-during-write (DRDW) signal, and may be used to indicate whether the corresponding marks have been properly formed by the incident write signal $S_I(t)$. Although $S_R(t)$ could be considered as either an electrical or an optical signal, the term "reflected write signal" as used herein will generally refer to an electrical signal resulting from detection of the corresponding optical signal in the return beam. $S_R(t)$ includes a reflected write pulse 110, corresponding to the incident write pulse 100 of $S_I(t)$. $S_R(t)$ has an amplitude of level 112 when $S_I(t)$ is at read level 102. During the incident write pulse 100, the amplitude of $S_R(t)$ increases along a rising edge 114 to a peak amplitude $V_{PK}$ before the onset of mark formation and decreases during mark formation to a plateau amplitude $V_{PL}$. After the reflected pulse falling edge 120, the amplitude first falls below and then returns to amplitude level 112. Although specified in terms of voltages in FIG. 2, the amplitude levels of $S_R(t)$ could also be specified in terms of current, power or another suitable parameter.

Characteristics of the reflected write signal $S_R(t)$ which can be monitored during recording to indicate proper mark formation include, for example, the voltage levels $V_{PK}$ and/or $V_{PL}$ or amplitude rates of change during reflected pulse 110. These monitored characteristics of $S_R(t)$ are referred to herein and elsewhere as mark formation effectiveness (MFE) signals. Additional detail regarding MFE signals generally and use of MFE signals to provide source power control in optical recording systems can be found in U.S. patent application Ser. No. 08/179,472 and U.S. Pat. Nos. 5,436,880 and 5,446,716, which are assigned to the assignee of the present invention, and incorporated herein by reference. The term "amplitude rate of change" refers generally to the change in reflected write pulse voltage, current or power as a function of time. An exemplary amplitude rate of change, characteristic of "burn-dark" optical media such as CD-R, is the rate at which reflected write pulse amplitude decays from voltage level $V_{PK}$ during mark formation.

Figure 3:
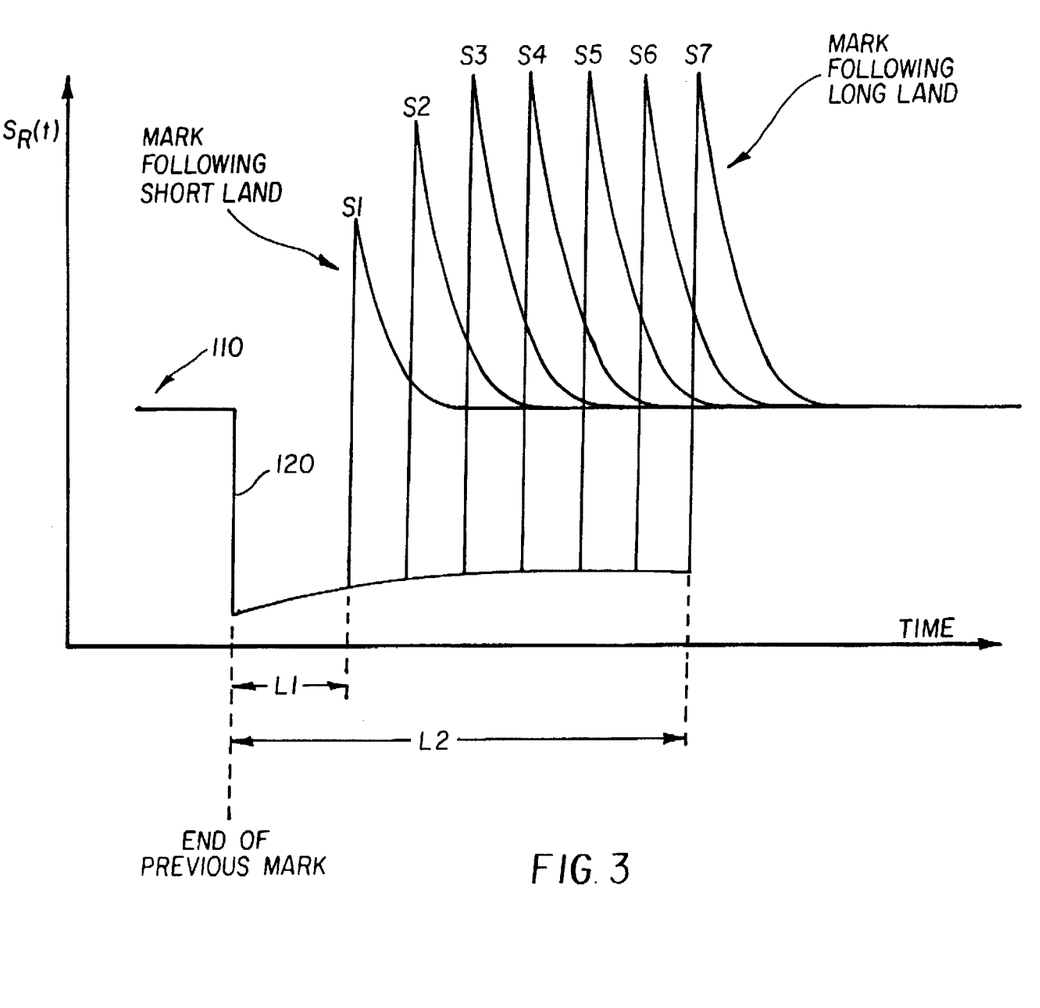
FIG. 3 is a plot of several superimposed reflected write signals which illustrates variation in reflected pulse peak amplitude resulting from intersymbol interference (ISI).

FIG. 3 illustrates exemplary variations in reflected write pulses of $S_R(t)$ which may be indicative of intersymbol interference (ISI). As noted above, ISI may be the result of thermal cross-talk during formation of neighboring marks during recording. FIG. 3 shows a number of superimposed reflected write pulses S1, S2 ... S7 relative to a falling edge 120 of a prior reflected pulse 110. The reflected pulse S1 corresponds to a mark which follows a short land L1 of length 3T and the reflected pulse S7 corresponds to a mark which follows a long land L2 of length 9T. The other reflected pulses S2–S6 correspond to marks which follow lands of lengths 4T–8T, respectively. The effect of ISI is evident in the peak amplitudes of reflected pulses S1 or S2 for marks which follow relatively short lands as compared to pulses S6 or S7 for marks which follow longer lands. The reduction in the peak amplitude for reflected pulses for marks following a short land is due in large part to pre-heating from a previously-written neighboring mark in conjunction with temperature dependence of the media reflectivity. Marks formed after longer lands are less affected by the pre-heating and therefore have reflected pulse peaks that are substantially equivalent in amplitude as is the case for pulses S3–S7. The ISI detection of the present invention in one embodiment involves detecting the difference in reflected pulse peak amplitude between a mark following a short land and another mark following a longer land.

The result of the ISI illustrated in FIG. 3 may be that marks following shorter lands are generally longer than desired. The position of the land-mark transition at the beginning of the mark following a shorter land may therefore fall outside the above-described window and thus introduce an error upon subsequent readback. The amount of ISI and corresponding reflected pulse peak amplitude variations will typically depend in part on the write strategy used. For example, an NT write strategy would generally be expected to produce greater peak amplitude variation than an (N−1)T strategy. This is because with the (N−1)T strategy the incident write pulse is one clock period shorter for a given write pulse, thereby allowing additional cool-down time between neighboring marks such that thermal cross-talk is reduced. An NT strategy will therefore generally introduce more undesirable variation in mark length than an (N−1)T strategy, and correspondingly higher non-linearity and readback data signal jitter.

Another recording system parameter which influences the amount of thermal cross-talk and resulting ISI is the bias power level 102 of the incident write pulse $S_I(t)$. The bias power level between write pulses causes a pre-heating effect on the medium. For example, an increase in bias power level from about 1 mW to 2 mW can significantly increase the length of marks that follow a short land.

Figure 4:
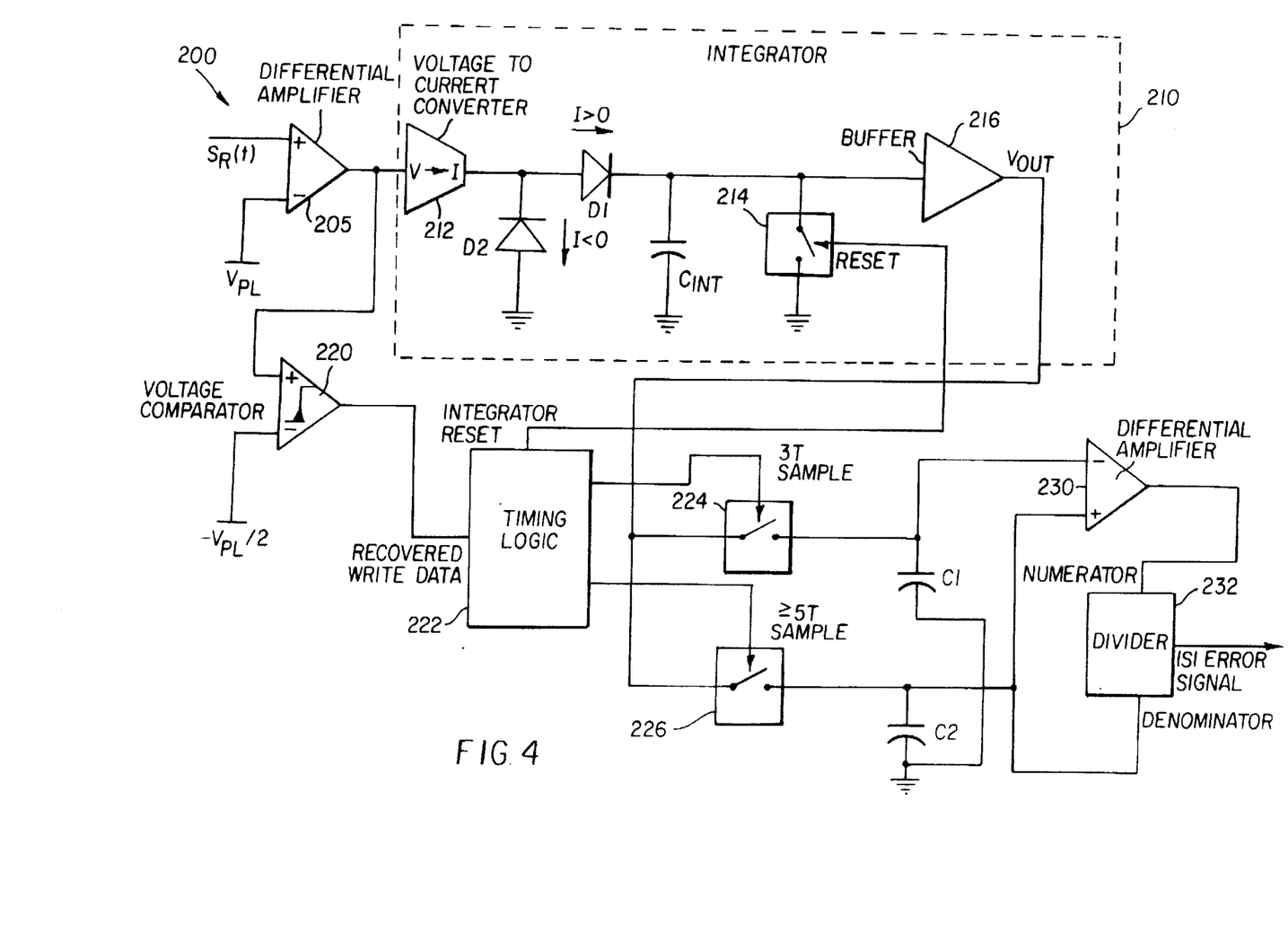
FIG. 4 is a schematic diagram of an exemplary ISI detector in accordance with the present invention.

FIG. 4 shows an exemplary ISI detector 200 in accordance with the invention. The detector 200 is illustrated in an embodiment using an NT write strategy. The detector 200 integrates the portion of the reflected write signal $S_R(t)$ above the plateau voltage level $V_{PL}$ to detect the above-described variations in reflected pulse peak amplitude. The voltage level $V_{PL}$ can be generated by sampling $S_R(t)$ at a point about 5T from the leading edge of a write pulse whose length exceeds 5T. Other suitable techniques for generating $V_{PL}$ could also be used. The bandwidth of a $V_{PL}$ level generator (not shown) should usually be wide enough to follow only relatively slow variations in $S_R(t)$ such as variations with frequency components of less than about 5 kHz. Increasing the bandwidth of the $V_{PL}$ level generator generally reduces the sensitivity of detector 200.

The reflected write signal $S_R(t)$ at the input of detector 200 is applied to a non-inverting input of a differential amplifier 205 and $V_{PL}$ is applied to an inverting input of amplifier 205. The output of amplifier 205 is applied to a voltage-to-current converter 212 in a resettable integrator 210. When $S_R(t)$ is above the $V_{PL}$ level, a positive current generated by voltage-to-current converter 212 passes through diode D1 into an integrating capacitor $C_{INT}$ thereby charging $C_{INT}$ in the positive direction. When $S_R(t)$ is below the $V_{PL}$ level, a negative current is generated by converter 212 and is shunted via diode D2 to ground. The integrator 210 further includes a reset switch 214 and a buffer 216. The reset switch 214 receives a reset pulse of a predetermined duration from a timing logic circuit 222. Each reset pulse is triggered in circuit 222 by the falling edge of the corresponding reflected write pulse to thereby reset the integrator voltage across $C_{INT}$ to zero. The switch 214 is in an open position during each reflected write pulse, and is closed after the falling edge of each reflected write pulse to thereby reset the integrator for the next reflected pulse. A suitable value for the integrator capacitor is on the order of 3300 to 4700 pF for systems operating at a write speed of 1× or 4.32 Mbits/sec.

The output of amplifier 205 is also applied to a voltage comparator 220. Comparator 220 generates a recovered write data signal which is a flat-top pulse version of $S_R(t)$ and corresponds generally to the incident write signal. The recovered write data is applied to the timing logic circuit 222 which generates first and second sample pulses. The first sample pulse in this embodiment is designed to detect peaks that follow a 3T land and the second sample pulse is designed to detect peaks that follow a ≥5T land. The 3T land and ≥5T land sample pulses control sample-and-hold switches 224 and 226, respectively, which apply the output of integrator 210 across either capacitor C1 or C2 and to either an inverting or non-inverting input of a differential amplifier 230. C1 and C2 may be, for example, on the order of 3300 pF at a write speed of 1×. The output of amplifier 230 is applied as the numerator to a signal divider 232. The denominator used in divider 232 is the integrated output corresponding to a reflected write pulse following a ≥5T land.

The amplifier 230 thus takes the difference between the integrator outputs for a first reflected write pulse following a 3T land and a second reflected write pulse following a ≥5T land. The divider normalizes this difference to the integrator output for the write pulse following the ≥5T land. It should be noted that the first reflected write pulse for a mark following a 3T land may either precede in time or follow in time the second reflected write pulse for a ≥5T land. The normalization serves to make the output of ISI detector 200 less sensitive to system parameters such as media type and less susceptible to sensitivity variations across a given medium. As noted in conjunction with FIG. 4 above, the peak amplitudes for reflected pulses S3–S7 corresponding to marks following lands of length 5T or more are sufficiently similar that the integrator output for one of these pulses may be used for normalization. Other possible normalization techniques include dividing the difference by the write power level or taking the ratio of the integrator outputs instead of their difference.

The resulting normalized difference represents an ISI error signal. The ISI error signal in this embodiment indicates the peak amplitude difference between one reflected write pulse corresponding to a mark following a 3T land and another reflected write pulse corresponding to a mark following a ≥5T land. The magnitude of the ISI error signal can thus detect whether a given mark recorded following a short land will be increased in length due to the above-described thermal cross-talk effects. Although implemented using marks following 3T and ≥5T lands in this embodiment, detector 200 could also detect differences between a mark following a 3T land and a mark following a 4T land. This is apparent from the amplitude differences between reflected pulses S1 and S2 of FIG. 3.

Figure 5:
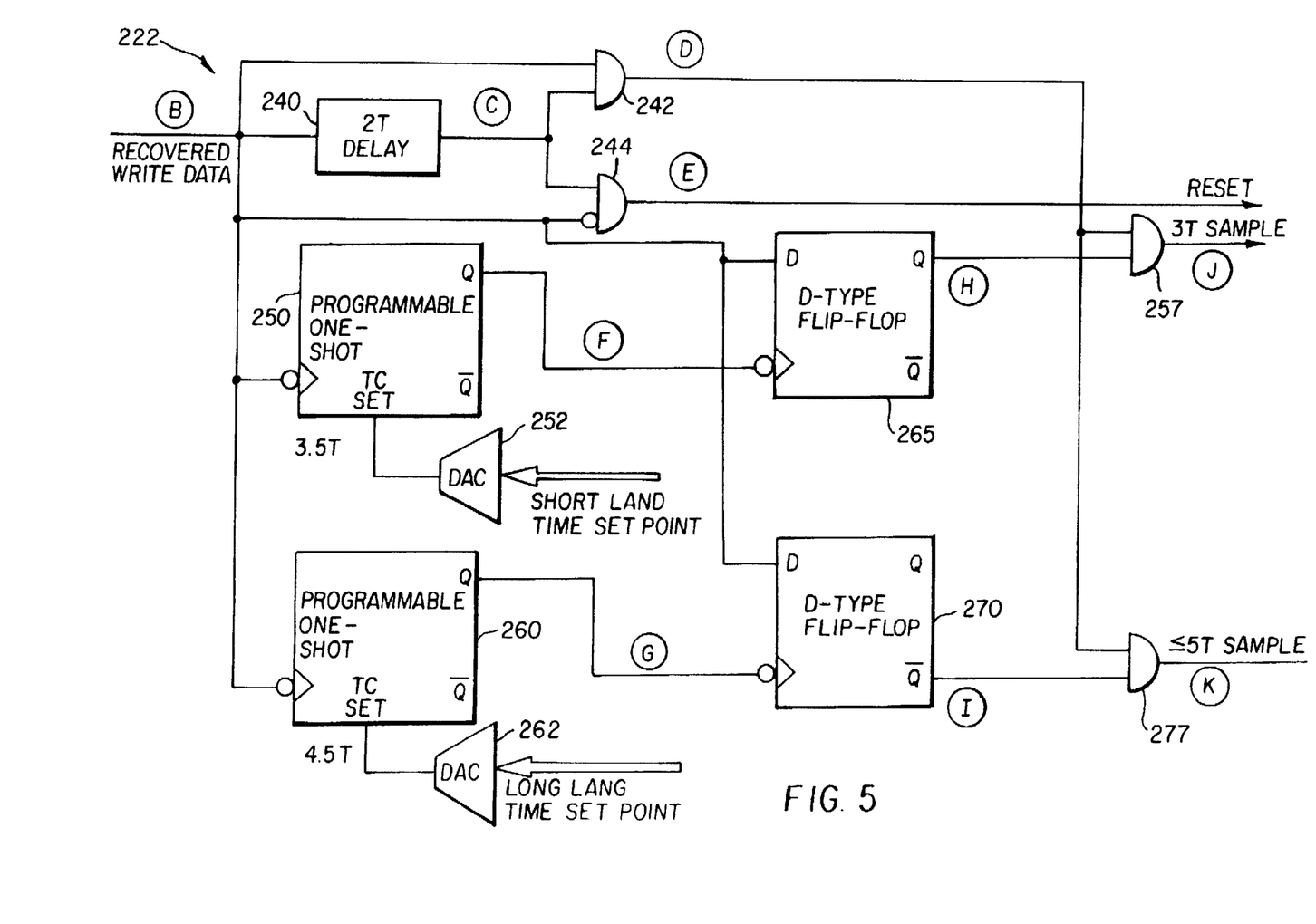
FIG. 5 is a schematic diagram of an exemplary timing logic circuit suitable for use in the ISI detector of FIG. 4.
Figure 6A:
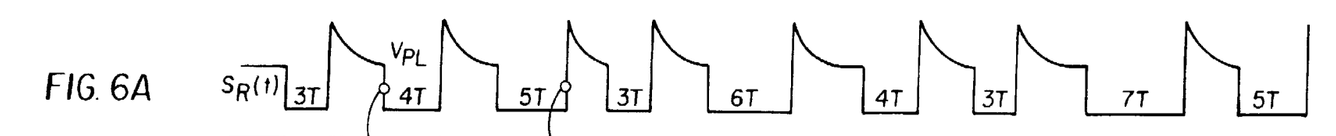
FIGS. 6A–6K constitute a timing diagram illustrating the operation of the exemplary timing logic circuit of FIG. 5.
Figure 6B:
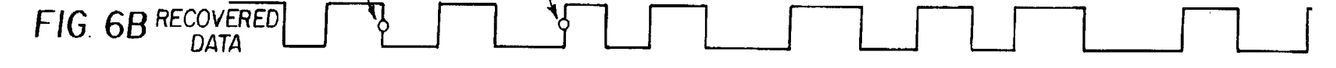
Figure 6C:
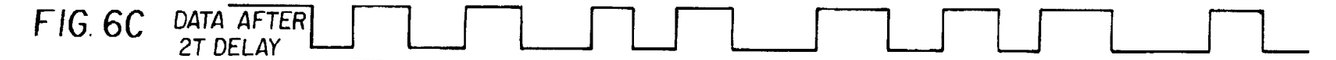
Figure 6D:
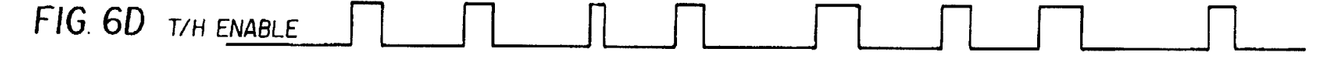
Figure 6E:
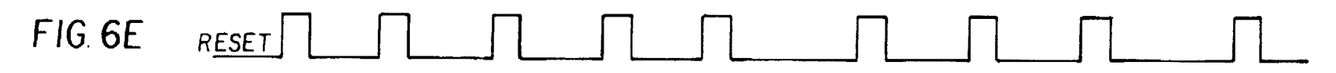

FIG. 5 shows an exemplary timing logic circuit 222 suitable for use in the ISI detector 200 of FIG. 4. A corresponding timing diagram is shown in FIGS. 6A–6K with the signals designated as B, C ... K in FIG. 5 shown in FIGS. 6B, 6C, ... 6K, respectively. FIG. 6A shows an exemplary reflected write signal $S_R(t)$ which includes a plurality of reflected write pulses corresponding to marks separated by lands of lengths 3T through 7T. The recovered write data signal of FIG. 6B is applied to an AND gate 242 along with a 2T-delayed version of the data signal from a delay element 240. The resulting track and hold (T/H) enable signal is shown in FIG. 6D and is applied to output AND gates 257, 277 to set the duration of the output 3T and ≥5T sample pulses. An inverted version of the recovered data signal is also applied to an AND gate 244 along with the delayed data signal from delay element 240 to thereby generate the integrator reset pulses shown in FIG. 6E.

The recovered write data signal is also applied as a clock input to a 3.5T programmable one-shot 250 and a 4.5T programmable one-shot 260. The duration of the output pulses from one-shots 250, 260 are set by voltages applied to time constant (TC) set inputs from respective digital-to-analog converters (DACs) 252, 262. The input to DACs 252, 262 are digital set point signals corresponding to the selected short land time duration and long land time duration, respectively. Although the short land and long land time durations are chosen as 3T and 5T in this example, alternative values could also be used and can be readily entered by applying the appropriate digital signals to DACs 252, 262. The programmable one-shot devices 250, 260 provide flexibility in selection of sample pulse durations such that detector 200 can accommodate ISI detection for a variety of different write strategies.

Figure 6F:
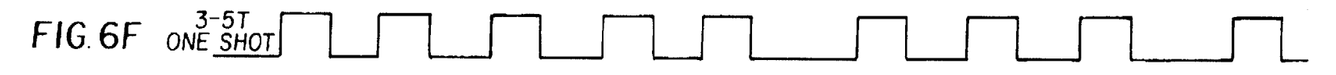
Figure 6G:
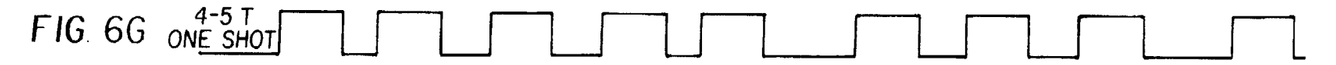
Figure 6H:
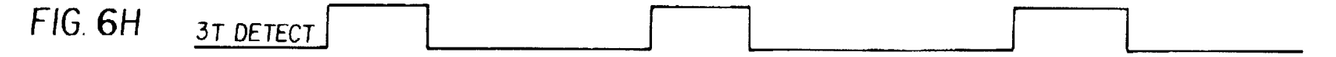
Figure 6I:
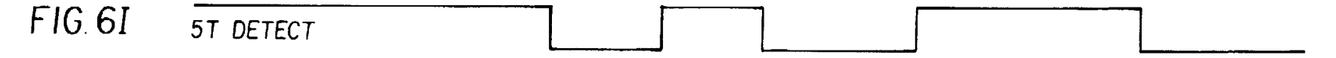
Figure 6J:
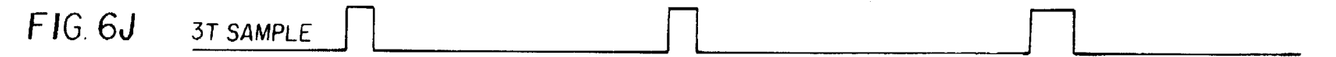
Figure 6K:
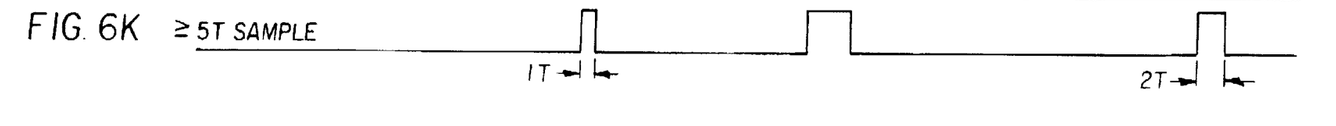

The outputs of one-shots 250, 260 are shown in FIGS. 6F and 6G and are applied in inverted form to clock inputs of D-type flip-flops 265, 270, respectively. The data inputs of flip-flops 265, 270 receive the recovered write data signal of FIG. 6B. The resulting 3T detect and ≥5T detect output signals from flip-flops 265, 270 are shown in FIGS. 6H and 6I and are applied to inputs of the output AND gates 257, 277, respectively. The outputs of AND gates 257, 277 are the 3T sample and ≥5T sample pulses applied to switches 224, 226 of FIG. 4 and are shown in FIGS. 6J and 6K, respectively. The 3T sample signal of FIG. 6J includes a sample pulse for each of the reflected write pulses in $S_R(t)$ which follow a land of length 3T. The ≥5T sample signal of FIG. 6K includes a sample pulse for each of the reflected write pulses of $S_R(t)$ which follow a land of length 5T or more. The signals of FIGS. 6A–6K are then processed in the manner described in conjunction with FIG. 4 above.

Figure 7:
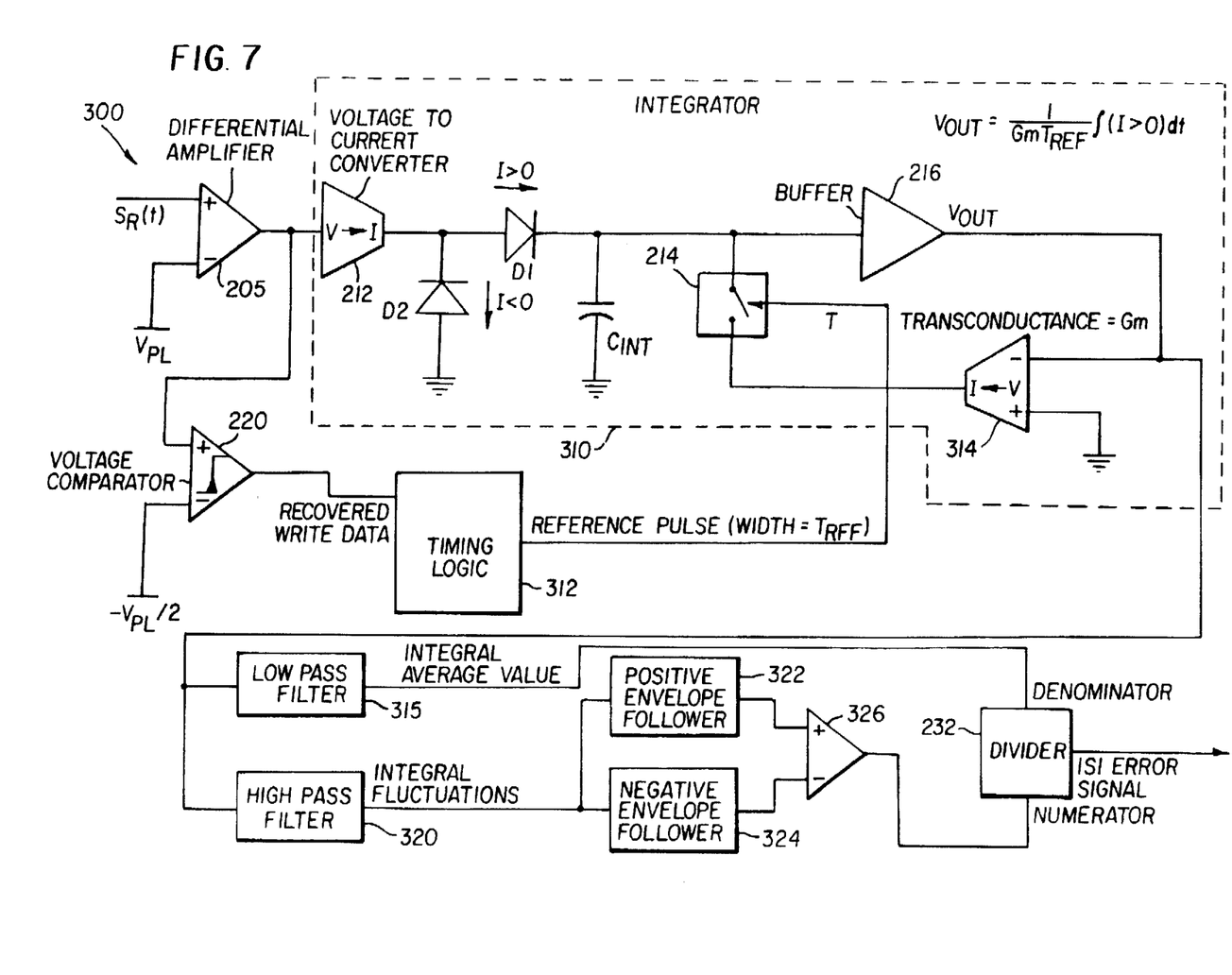
FIG. 7 is a schematic diagram of another exemplary ISI detector in accordance with the present invention.

FIG. 7 shows an ISI detector 300 in accordance with another exemplary embodiment of the invention. The detector 300 includes differential amplifier 205, converter 212 comparator 220, diodes D1, D2, and capacitor $C_{INT}$ configured in the manner described in conjunction with FIG. 4 above. The capacitor $C_{INT}$ in integrator 310 charges in a positive direction while integrating the positive current flowing through D1. A reference pulse of duration $T_{REF}$ is generated by a timing logic circuit 312 at the leading edge of each reflected write pulse. Each reference pulse closes switch 214 and thereby allows a voltage-to-current converter 314 having transconductance Gm to remove from $C_{INT}$ a charge proportional to the voltage on $C_{INT}$.

Figure 8:
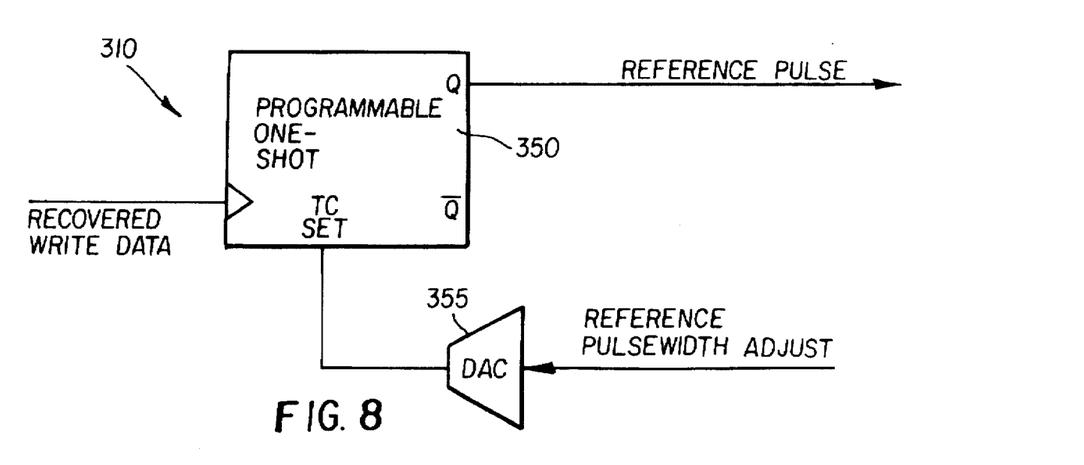
FIG. 8 is a schematic diagram of an exemplary liming logic circuit suitable for use in the ISI detector of FIG. 7.

FIG. 8 shows an exemplary timing logic circuit suitable for use in the detector 300. The circuit 310 includes a programmable one-shot 350 which receives as a clock input a recovered write data signal such as that shown in FIG. 6B. The duration of the reference pulse supplied at the output of the one-shot 350 is set in accordance with a voltage received on its TC set input from a DAC 355. The input to DAC 355 is a digital signal supplied from a system controller (not shown) and indicative of the desired reference pulse duration. The circuit 310 allows the reference pulse duration to be readily altered to accommodate different system write speeds and/or write strategies.

Referring again to FIG. 7, a balance or steady-state condition is reached in the integrator 310 when the positive charge $Q_{POS}$ delivered to $C_{INT}$ through D1 during each reflected write pulse is substantially compensated by the charge removed from $C_{INT}$ by the corresponding reference pulse. The balance condition is reached when the integrator voltage $V_{OUT}$ at the output of buffer 216 satisfies the relation:

$$V_{OUT} = \frac{1}{GmT_{REF}} \int (I > 0) dt$$

in which the integral of the positive current I>0 through D1 corresponds to $Q_{POS}$. For variations in the integral of the positive current which are slow relative to the inherent bandwidth of integrator 310, such as those corresponding to the reflected pulse peak amplitude variations shown in FIG. 3, the integrator output $V_{OUT}$ is proportional to the integral of the positive current flowing through D1. The fraction F of the accumulated charge on $C_{INT}$ removed by each reference pulse and the integrator gain $K_{INT}$ are given by:

$$F = Gm \frac{T_{REF}}{C_{INT}}$$

$$K_{INT} = \frac{1}{F}$$

The following example will illustrate the operation of integrator 310. If 25% of the accumulated charge on $C_{INT}$ is removed with each reset pulse of duration $T_{REF}$, such that F is equal to 0.25 and $K_{INT}$ is equal to 4.0, an input reflected write pulse corresponding to an integrator output voltage of 1.0 volts will yield a capacitor voltage of 4.0 volts. The integrator output will settle to within 10% of its final value after about eight input reflected pulses. The above-noted EFM coding used in many CD-R recorders has an average mark and land length of about 6T where T is on the order of 39 ns for a write speed of 6× or six times the 1× write speed of 4.32 Mbits/sec. The values of F and $K_{INT}$ in this example thus correspond to a 10% settling time of about 3.7 µsec. If F is increased to 0.50, such that $K_{INT}$ is decreased to 2.0, the integrator output will settle to within 10% of its final value after only three reflected pulses or within about 1.4 µsec.

The use of integrator gain values $K_{INT}$ of about 2.0 or less will therefore permit integrator 310 to respond on a substantially pulse-by-pulse basis to variations in the amount of positive charge delivered to $C_{INT}$ through D1. The detector 300 detects ISI by monitoring the corresponding variations in the integrator output voltage $V_{OUT}$. The integrator output is applied to a low pass filter 315 which provides an average value of the integrator output and to a high pass filter 320 which passes ISI-induced variations in $V_{OUT}$. Suitable cut-off frequencies for the low pass filter 315 and high pass filter 320 at a write speed of 1× are on the order of 300 Hz and 2 kHz, respectively. The peak-to-peak variations in $V_{OUT}$ are measured using a positive envelope follower 322 and a negative envelope follower 324. The output of the envelope followers 322, 324 are applied to inputs of a differential amplifier 326. The output of amplifier 326 corresponds to a relative measurement of the peak-to-peak amplitude variation of one or more reflected write pulses of the input reflected signal $S_R(t)$. The amplitude variation measurement is normalized by dividing it by the average integral value from low pass filter 315 in divider 232. The output of divider 232 represents an ISI error signal in accordance with the invention.

Although the above-described embodiments monitor portions of a reflected write signal during a reflected write pulse, an alternative embodiment of the invention could monitor portions of the reflected write signal which precede the reflected write pulses. Such portions of the reflected write signal correspond generally to lands on the medium, and a portion corresponding to a short land could be compared to a portion corresponding to a longer land in order to detect the presence of ISI. It can be seen from FIG. 3 that the reflected write signal amplitude between write pulses may vary depending upon the length of the land, and the above-described comparison can thus be used to detect ISI. The term "reflected write pulse" as used herein should thus be understood to include the portions of the reflected write signal which precede a given pulse and are useful for indicating the presence of ISI.

It should be emphasized that although the exemplary ISI detectors of FIGS. 4 and 7 both utilize integration operations, other circuits in accordance with the invention need not utilize integration. For example, an alternative ISI detector may simply detect and compare amplitude peaks or other parameters of first and second reflected pulses corresponding to a first mark following a short land and a second mark following a longer land, respectively. The reflected pulse for the first mark may be detected either before or after detection of the reflected pulse for the second mark, and the first mark may therefore either precede or follow the second mark on a given data track of the medium.

The ISI error signals described herein may be utilized in a variety of different optical recording applications. For example, the ISI error signal could be monitored during a series of trial recordings on a designated section of a CD-R medium to determine optimum write strategies and/or power levels. In addition, the ISI error signal can predict the quality of a given write strategy as a function of power level during recording. The ISI error signal can also be used to detect unnecessary increases in write or bias power levels given a particular recording strategy. As another example, the ISI error signal could be used to detect optical spot aberrations.

It should be noted that portions of the ISI detection circuits of FIGS. 4 through 8 may be completely or partially implemented in software. The software may be executed using a computer, microprocessor, application-specific integrated circuit (ASIC) or other digital data processor within a system controller of the optical recording system.

The above-described embodiments of the invention are intended to be illustrative only. Numerous alternative embodiments may be devised by those skilled in the art without departing from the scope of the appended claims.

PARTS LIST

| | |
|---|---|
| $C_{INT}$, C1, C2 | capacitors |
| D1, D2 | diodes |
| L1, L2 | land lengths |
| $S_I(t)$ | incident write signal |
| $S_R(t)$ | reflected write signal |
| S1–S7 | reflected write pulses |
| T | time period |
| $V_{OUT}$ | integrator output voltage |
| $V_{PK}$, $V_{PL}$ | reflected pulse voltage levels |
| 20 | optical recording system |
| 32 | optical source |
| 34 | collimating lens |
| 36 | beam expander/splitter |
| 37 | beam splitter surface |
| 38 | focusing lens |
| 40 | front facet detector |
| 42 | quarter wave plate |
| 44 | objective lens |
| 46 | optical recording medium |
| 46A | data storage surface |
| 46B | transparent substrate |
| 52 | focusing lens |
| 54 | detector |
| 54A, 54B | detector elements |
| 100 | incident write pulse |
| 102 | read power level |
| 104 | write power level |
| 110 | reflected write pulse |
| 112 | reflected power level |
| 114 | reflected pulse rising edge |
| 120 | reflected pulse falling edge |
| 200 | ISI detector |
| 205 | differential amplifier |
| 212 | voltage-to-current converter |
| 214 | reset switch |
| 216 | buffer amplifier |
| 220 | comparator |
| 222 | timing logic circuit |
| 224, 226 | sample switches |
| 230 | differential amplifier |
| 232 | signal divider |
| 240 | delay element |
| 242, 244, 257, 277 | AND gates |
| 250, 260 | programmable one-shots |
| 252, 262 | digital-to-analog converters |
| 265, 270 | D-type flip-flops |
| 300 | ISI detector |
| 310 | integrator |
| 312 | timing logic circuit |
| 314 | voltage-to-current converter |
| 315 | low pass filter |
| 320 | high pass filter |
| 322 | positive envelope follower |
| 324 | negative envelope follower |
| 326 | differential amplifier |
| 350 | programmable one-shot |
| 355 | digital-to-analog converter |

What is claimed is:

1. An apparatus for use in an optical recording system in which an incident beam records data as marks on a recording medium and an optical detector generates a reflected write signal from a return beam reflected from the medium, said apparatus comprising:

an interference detector coupled to the optical detector and having an input connected to receive the reflected write signal and an output corresponding to a difference between first and second reflected write pulses of the reflected write signal, wherein the output of the interference detector is an intersymbol interference (ISI) error signal indicative of a variation in amplitude of the first reflected write pulse relative to the second reflected write pulse;

the first reflected write pulse corresponding to a first mark following a first land and the second reflected write pulse corresponding to a second mark following a second land longer than the first land.

2. An apparatus for use in an optical recording system in which an incident beam records data as marks on a recording medium and an optical detector generates a reflected write signal from a return beam reflected from the medium, said apparatus comprising:

an interference detector coupled to the optical detector and having an input connected to receive the reflected write signal and an output corresponding to a difference between first and second reflected write pulses of the reflected write signal, wherein such difference is a variation in an integrator output voltage produced by the first and second reflected write pulses;

the first reflected write pulse corresponding to a first mark following a first land and the second reflected write pulse corresponding to a second mark following a second land longer than the first land.

3. An apparatus for use in an optical recording system in which an incident beam records data as marks on a recording medium and an optical detector generates a reflected write signal from a return beam reflected from the medium, said apparatus comprising:

an interference detector coupled to the optical detector and having an input connected to receive the reflected write signal and an output corresponding to a difference between first and second reflected write pulses of the reflected write signal, and a normalizing circuit which normalizes the detected difference between the first and second reflected write pulses by dividing the difference by an average value derived from at least one of the two reflected write pulses; and the first reflected write pulse corresponding to a first mark following a first land and the second reflected write pulse corresponding to a second mark following a second land longer than the first land.

4. An apparatus for use in an optical recording system in which an incident beam records data as marks on a recording medium and an optical detector generates a reflected write signal from a return beam reflected from the medium, said apparatus comprising:

an interference detector coupled to the optical detector and having an input connected to receive the reflected write signal and an output corresponding to a difference between first and second reflected write pulses of the reflected write signal, wherein such difference is a difference between an integrated area under the first reflected write pulse and an integrated area under the second reflected write pulse;

the first reflected write pulse corresponding to a first mark following a first land and the second reflected write pulse corresponding to a second mark following a second land longer than the first land.

5. An apparatus for use in an optical recording system in which an incident beam records data as marks on a recording medium and an optical detector generates a reflected write signal from a return beam reflected from the medium, said apparatus comprising:

(a) an interference detector coupled to the optical detector and having an input connected to receive the reflected write signal and an output corresponding to a difference between first and second reflected write pulses of the reflected write signal;

(b) the interference detector further includes:

(i) an integrator having a first input connected to receive at least a portion of the reflected write signal;

(ii) a timing logic circuit having an output coupled to a second input of the integrator, the timing logic circuit output corresponding to a pulse signal supplied to the integrator for each of the first and second reflected write pulses; and (iii) a signal difference circuit coupled to an output of the integrator and receiving therefrom an integrator output signal, the difference circuit having an output corresponding to an error signal indicative of the difference between the first and second reflected write pulses; and (c) the first reflected write pulse corresponding to a first mark following a first land and the second reflected write pulse corresponding to a second mark following a second land longer than the first land.

6. The apparatus of claim 5 wherein the timing logic circuit generates from the reflected write signal first and second sample pulses, wherein the first and second sample pulses indicate portions of the integrator output signal corresponding to the first and second reflected write pulses, respectively.

7. The apparatus of claim 6 wherein the signal difference circuit further includes:

first and second sample-and-hold circuits coupled to the timing logic circuit and the integrator output and operative to sample the integrator output signal during the first and second sample pulses, respectively; and a differential amplifier having an input coupled to an output of each of the sample-and-hold circuits and an output corresponding to the difference between the first and second reflected write pulses.

8. The apparatus of claim 5 wherein the signal difference circuit further includes:

a filter having an input connected to the integrator output and an output corresponding to variations in the integrator output signal resulting from the difference between the first and second reflected write pulses;

positive and negative envelope followers with inputs coupled to the output of the filter; and a differential amplifier having inputs coupled to outputs of the positive and negative envelope followers and an output corresponding to the difference between the first and second reflected write pulses.

9. The apparatus of claim 8 further including a normalizer circuit comprising:

a second filter having an input connected to the integrator output and an output corresponding to an average value of the integrator output signal; and a signal divider having one input connected to an output of the second filter, another input connected to the output of the differential amplifier, and an output corresponding to a normalized error signal.

10. The apparatus of claim 5 wherein the integrator further includes:

a voltage-to-current converter having an input connected to receive the reflected write signal;

first and second current-directing elements coupled to the converter, each of the current-directing elements passing input currents of the reflected write signal of a particular sign; and an integrating capacitor connected to receive current passing through one of the current-directing elements and to integrate the received current for a period of time during a given reflected write pulse to thereby provide the integrator output signal.

11. The apparatus of claim 10 wherein the integrator further includes a switch connected across the integrating capacitor and having a control input coupled to the second input of the integrator, the control input receiving the pulse signal from the timing logic circuit as a reset pulse to reset a voltage across the capacitor after integration of the received current during the given reflected write pulse.

12. The apparatus of claim 10 wherein the integrator further includes:

a switch coupled to an output terminal of the integrating capacitor and having a control input coupled to the timing logic circuit and receiving the pulse signal therefrom as a reference pulse; and a second voltage-to-current converter connected in a feedback loop between the output terminal and the switch and operative to remove a predetermined amount of charge from the integrating capacitor during the reference pulse.

13. In an optical recording system in which an incident beam records data on an optical recording medium as marks and in which a return beam reflected from said medium is detected to provide a reflected write signal, a method comprising the steps of:

detecting first and second reflected write pulses of the reflected write signal, the first reflected write pulse corresponding to a first mark following a first land and the second reflected write pulse corresponding to a second mark following a second land longer than the first land;

generating a signal indicative of a difference between the first and second reflected write pulses; and generating an intersymbol interference (ISI) error signal indicative of a variation in amplitude of the first reflected write pulse relative to the second reflected write pulse.

14. In an optical recording system in which an incident beam records data on an optical recording medium as marks and in which a return beam reflected from said medium is detected to provide a reflected write signal, a method comprising the steps of:

detecting first and second reflected write pulses of the reflected write signal, the first reflected write pulse corresponding to a first mark following a first land and the second reflected write pulse corresponding to a second mark following a second land longer than the first land; and generating a signal indicative of a difference between the first and second reflected write pulses, and detecting variations in an integrator output voltage produced by the first and second reflected write pulses.

15. In an optical recording system in which an incident beam records data on an optical recording medium as marks and in which a return beam reflected from said medium is detected to provide a reflected write signal, a method comprising the steps of:

detecting first and second reflected write pulses of the reflected write signal, the first reflected write pulse corresponding to a first mark following a first land and the second reflected write pulse corresponding to a second mark following a second land longer than the first land; and generating a signal indicative of a difference between the first and second reflected write pulses, wherein such difference is a difference between an integrated area under the first reflected write pulse and an integrated area under the second reflected write pulse.

16. In an optical recording system in which an incident beam records data on an optical recording medium as marks and in which a return beam reflected from said medium is detected to provide a reflected write signal, a method comprising the steps of:

detecting first and second reflected write pulses of the reflected write signal, integrating the first and second reflected write pulses to provide an integrated output signal, and sampling the integrated output signal at times corresponding to the respective reflected write pulses, the first reflected write pulse corresponding to a first mark following a first land and the second reflected write pulse corresponding to a second mark following a second land longer than the first land; and generating a signal indicative of a difference between the first and second reflected write pulses.

* * * * *